United States Patent [19]

Wickel et al.

[11] Patent Number: 4,980,322

[45] Date of Patent: * Dec. 25, 1990

[54] SINTERABLE SI$_3$N$_4$ POWDERS CONTAINING SINTERING ADDITIVES AND A PROCESS FOR THEIR PREPARATION

[75] Inventors: Ulrike Wickel; Gerhard Franz; Benno Laubach, all of Krefeld, Fed. Rep. of Germany

[73] Assignee: Bayer Aktiengesellschaft, Leverkusen, Fed. Rep. of Germany

[ * ] Notice: The portion of the term of this patent subsequent to Jul. 4, 2006 has been disclaimed.

[21] Appl. No.: 377,778

[22] Filed: Jul. 10, 1989

Related U.S. Application Data

[63] Continuation of Ser. No. 236,508, Aug. 25, 1988, abandoned, which is a continuation of Ser. No. 53,957, May 22, 1987, abandoned.

[30] Foreign Application Priority Data

May 24, 1986 [DE] Fed. Rep. of Germany ....... 3617488

[51] Int. Cl.$^5$ ............................................. C04B 35/58
[52] U.S. Cl. ...................................... 501/97; 501/98; 423/406
[58] Field of Search ................... 501/97, 98; 423/406, 423/409; 241/39

[56] References Cited

U.S. PATENT DOCUMENTS

| | | | |
|---|---|---|---|
| 4,073,845 | 2/1978 | Buljan et al. | 501/97 |
| 4,124,402 | 11/1978 | Greskovich et al. | 501/97 |
| 4,511,525 | 4/1985 | Tsuge et al. | 501/97 |
| 4,845,060 | 7/1989 | Wickel et al. | 501/97 |

OTHER PUBLICATIONS

Science of Ceramic Chemical Processing, ed. by Hench and Ulrich, Wiley, N.Y., 1986, p. 539ff.
Chemical Abstracts, 99:109670p (1983).

*Primary Examiner*—William R. Dixon, Jr.
*Assistant Examiner*—Anthony Green
*Attorney, Agent, or Firm*—Connolly and Hutz

[57] ABSTRACT

Sinterable Si$_3$N$_4$ powder containing Si$_3$N$_4$ particles and sintering additives wherein Si$_3$N$_4$ particles have an average particle size of less than 1 μm, contain no particle having a diameter greater than 100 μm, have a total content of metallic impurities less than 1000 ppm and an iron content of less than 200 ppm, and wherein the sintering additives are uniformly distributed throughout the powder is prepared by co-grinding pulverulent sintering additive and Si$_3$N$_4$ containing less than 1000 ppm metallic impurities in a spiral jet mill.

5 Claims, No Drawings

SINTERABLE $Si_3N_4$ POWDERS CONTAINING SINTERING ADDITIVES AND A PROCESS FOR THEIR PREPARATION

This application is a continuation, of application Ser. No. 236,508, filed Aug. 25, 1988 now abandoned.

Which is a continuation of application Ser. No. 053,957 filed May 22, 1987, abandoned.

This invention relates to $Si_3N_4$ powders containing sintering additives and having an average particle size of less than 1 μm and containing only a small amount of metallic impurities. The invention further relates to a process for the preparation of the said $Si_3N_4$ powders containing sintering additives.

BACKGROUND OF THE INVENTION

Processes for gas pressure sintering for the production of ceramic molded parts from $Si_3N_4$ powders have gained increasingly in importance. Gas pressure sintering has the advantage over the hot press process that it can be used for producing shapes of any degree of complexicity and it has the further advantage of costing much less than the hot isostatic pressure molding process.

$Si_3N_4$ powders, however, cannot be sintered in their pure form. It is only after so called sintering additives have been added to the material is capable of sintering and hence of completely densifying. Oxidic materials such as MgO, $Al_2O_3$, $Y_2O_3$ and $La_2O_3$ have, in many cases, proved to be useful sintering additives but nonoxidic substances such as AlN, $Mg_3N_2$, and soforth have also been found satisfactory. In the process of sintering, the sintering additives form liquid phases together with a proportion of the ceramic material and thereby initiate the mechanism of liquid phase sintering. After the sintering process, the sintering additives are present in the structure as secondary phases.

The structure of the sintered body and hence its strength, one the most important properties of ceramic components, is determined to a large extent by the uniformity with which the secondary phase is distributed in the structure before, during and after sintering. If the liquid phase is unevenly distributed during the sintering process then the whole structure will be inhomogeneous after sintering. The statistical reliability of the prediction of expected strength values of the sintered ceramics material is thereby reduced. Incomplete adjustment of equilibrium in the formation of the liquid phase due to uneven distribution has particularly adverse effects if the liquid phase is thereby prevented from recrystallizing on cooling, as it would be expected to do if equilibrium were completely adjusted, and instead solidifies as a glass-like substance in the structure. Glassy secondary phases soften at much lower temperatures than crystalline secondary phases and thereby drastically reduce the strength at high temperature. Homogeneous formation of the liquid phase conforming to the chemical equilibrium is therefore an important criterion for gas pressure sintering of $Si_3N_4$.

If a homogeneous liquid phase is to be obtained, the sintering additives should as far as possible already be uniformly distributed in the material before sintering takes place. For this purpose, the $Si_3N_4$ powders and pulverulent sintering additives are generally ground together in wet mills (attrition mills, ball mills, planet mills, etc). This not only breaks down any agglomerations of powder but also ensures a statistically uniform distribution of the sintering additives throughout the starting material.

$Si_3N_4$ powders prepared by wet grinding, however, still have serious disadvantages due to abrasion of the grinding bodies and to the fact that the powders reagglomerate on drying so that relatively hard agglomerates are again formed.

It is therefore an object of the present invention to provide a sinterable $Si_3N_4$ powder which does not have these disadvantages.

Our co-pending application Ser. No. 54,029, filed May 22, 1987, discloses and claims silicon nitride powders having an average particle size of less than 1 micron and no particles with a diameter greater than 100 micron, said powder having a total metallic impurity content of less than 1000 parts per million and an iron content of less than 200 parts per million.

BRIEF DESCRIPTION OF THE INVENTION

Such $Si_3N_4$ powders have now surprisingly been found. The present invention relates to a sinterable $Si_3N_4$ powder containing sintering additives and having an average particle size of agglomerates of less than 1 μm, characterised in that it contains no particles having a diameter greater than 100 μm and that the total amount of metallic impurities present is less than 1000 ppm and in particular the iron content is less than 200 ppm, and the sintering additives are uniformly distributed in the whole quantity of powder.

The $Si_3N_4$ powders containing uniformly destributed sintering additives according to the present invention are produced by cogrinding agglomerated $Si_3N_4$ and pulverulent sintering additives in a spiral jet mill.

DETAILED DESCRIPTION OF THE INVENTION

A $Si_3N_4$ powder in which the total content of metallic impurities is less than 200 ppm is particularly preferred. The $Si_3N_4$ powder according to the invention may contain various sintering additives but a preferred sintering additive is $Li_2O$, BeO, MgO, $B_2O_3$, $Al_2O_3$, $Ga_2O_3$, $Sc_2O_3$, $Y_2O_3$, $La_2O_3$, $TiO_2$, $ZrO_2$, $HfO_2$, $Cr_2O_3$, an oxide or rare earths or a mixture of two or more of the above mentioned oxides.

AlCN and $Mg_3N_2$ are particularly preferred non-oxidic sintering additives.

The present invention also relates to a process for the preparation of the powder according to the invention, characterised in that an agglomerated $Si_3N_4$ powder containing less than 1000 ppm, preferably less than 200 ppm of metallic impurities is ground together with a pulverulent sintering additive in a spiral jet mill.

Spiral jet mills are devices which are well-known in the grinding art. The material to be ground is entrained in a fluid jet which is injected at suitable angle into a chamber wherein a spiral vortex is produced. Collision of the particles causes the entrained solid material to be reduced in particle size. The powder of a suitable small size is removed and unbroken particles remain in the spiral vortex until reduced to a suitable size. Spiral jet mills of this type are illustrated and their operation more fully explained in the following publications. H. Kürten, H. Rumpf, Chemie-Ing.-Techn. 38, 1187 (1966) and W. Schäfer, K. Sommer, Reprints of 1. World Congress on Particle Technology, Part II, S. 325, ed. by K. Leschonski, publ. NMA, Messezentrum, 8500 Nürnberg 50.

It must be described as distinctly surprising that uniform mixing of $Si_3N_4$ powders and sintering additives can be achieved by dry grinding in spiral jet mills without the material becoming contaminated by abrasion and without subsequent formation of hard agglomerates. In view of the fact that the particles of $Si_3N_4$ powder put into the mill and the particles of sintering additive put into the mill differ in size, one would have expected the two components to separate in the process of spiral jet grinding since the process of sifting which takes place simultaneously with the grinding process first discharges the finest grains while the somewhat coarser grains are discharged only after a considerably longer grinding period. Thus it is known from the dissertation of G. Wötting, Berlin 1983 that air jet grinding of $Si_3N_4$ powder is not suitable for mixed grinding; in the process according to the invention, however, no separation takes place and in fact spiral jet grinding of a coarsely premixed powder results in uniform distribution of the sintering additives in the $Si_3N_4$ powder. The uniform distribution can be demonstrated by spot check analyses taken from a large quantity of product.

One particular advantage of the grinding process is that the agglomerates of $Si_3N_4$ powder and of sintering additive powder are broken down at the same time and the sifting which accompanies the grinding process ensures that the product will be free over sized particles.

According to one particularly preferred embodiment of the process according to the invention, the grinding chamber, the pipes, the feed nozzle and other parts of the mill with which the product comes into contact are made of a non-metallic matrial. Metal abrasion and hence contamination of the powder which should be as pure as possible for sintering are thereby prevented. The highly abrasion resistant synthetic material Vulkollan and wear resistant ceramic materials $B_4C$, $Al_2O_3$, SiC and/or $Si_3N_4$ have proved to be particularly advantageous.

As an additional step to prevent contamination with impurities, it is advisable to arrange for the ground powder to be deposited on a filter sack of needled felt, synthetic fabric or plastics-coated fabric.

Air, nitrogen and/or argon should be used as a grinding gas during the grinding process and the gas should preferably be at an excess pressure of from 2 to 10 bar.

In contrast to the $Si_3N_4$ powders known in the art, the $Si_3N_4$ powder according to the invention is distinguished by its freedom from oversized particles. This freedom from oversized particles is demonstrated by grindometer measurements using a Hegman gauge according to DIN 53 203. These measurements are conventionally used as a method for testing inorganic pigments but have not hitherto been used for ceramic powders. The particle sizes of ceramic powders have hitherto been measured by methods which have a much worse detection limit for coarse grains, such as counting methods (laser diffraction, Coulter counters, etc.), sedimentation analyses and determinations of sieve residues. These methods were not able to detect small numbers of large particles.

Testing of known $Si_3N_4$ powders with the Hegman gauge showed that even when the powders had a small average particle size, in some cases of less than 1 $\mu$m, they still contained a disturbing proportion of oversized particles greater than 100 $\mu$m and in some cases even greater than 250 $\mu$m.

The $Si_3N_4$ powder according to the invention, by contrast, is a disagglomerated, pure mixture of $Si_3N_4$ powder with sintering additives which is free from oversized particles and can be worked up into molded articles without further treatment of the powder and is eminently suitable for sintering.

In the following examples, the invention is illustrated by way of example but not limited thereby.

EXAMPLE 1

A $Si_3N_4$ powder with a total content of metallic impurities of about 700 ppm, and in particular an iron content of <100 ppm, and having a maximum particle diameter, determinable by means of a Hegmann gauge, of 200 $\mu$m, was mixed with $Y_2O_3$ and $Al_2O_3$ powder in a mixer, in the dry state. The content of $Y_2O_3$ in the total mixture was 10% by weight and that of $Al_2O_3$ 5% by weight. The average particle diameter of the powder mixture was about 0.8 $\mu$m. As can be seen from FIGS. 1a, b and c, which show an electron-microscopic photograph (SEM) of a powder specimen and the corresponding Y and Al element distribution diagrams the distribution of $Y_2O_3$, and in particular that of $Al_2O_3$, is inhomogeneous.

The mixture was ground in a spiral jet mill with a grinding pressure of 5 bars and a throughput capacity of 290 g/h. The grinding gas was nitrogen. The interior of the grinding chamber was lined with Vulkollan. The product was deposited on filter bags made of Dralon fabric.

An iron content of <100 ppm was determined for the ground powder. The average particle diameter is about 0.4 $\mu$m after grinding and the maximum particle diameter, determinable by means of a Hegman gauge, is 100 $\mu$m. The electron-microscopic photograph (SEM) in FIG. 2a and the particle size distribution curves in FIG. 3 clearly show the deagglomeration of the starting powder which takes place as a result of grinding. The homogeneous distribution of the sintering additives $Y_2O_3$ and $Al_2O_3$ after grinding can be seen from the element distribution diagrams in FIG. 2b and c.

EXAMPLE 2

A $Si_3N_4$ powder with a total content of metallic impurities of less than 400 ppm and in particular an iron content of <100 ppm, and having an average particle diameter, determined by means of an ultracentrifuge of 0.5 $\mu$m was mixed in the dry state with $Y_2O_3$ and $Al_2O_3$ powder. The content of $Y_2O_3$ in the total mixture was 10% by weight and the content of $Al_2O_3$ 5% by weight. The maximum particle diameter was determined to be 150 $\mu$m using a Hegmann gauge. The standard deviation of five random specimen analyses, in which the $Y_2O_3$ and $Al_2O_3$ contents were determined by X-ray fluorescence analyses was ±11.3% in respect of the $Y_2O_3$ content and ±8.5% in respect of the $Al_2O_3$ content.

The mixture was ground in a spiral jet mill with a grinding pressure of 5 bars and a throughput capacity of 280 g/h. The grinding gas was nitrogen. The interior of the grinding chamber was lined with Vulkollan. The product was deposited on filter bags made of Dralon fabric.

An iron content of 87 ppm was determined for the ground powder. The average particle diameter was 0.46 $\mu$m after grinding and the maximum particle diameter, determined by a Hegmann gauge, was 100 $\mu$m. The standard deviation of five random specimen analyses, in which $Y_2O_3$ and $Al_2O_3$ contents were determined by X-ray fluorescence analyses, was less than ±1% in respect of the $Y_2O_3$ content and ±3.9% in respect of the Al$_2$O$_3$ content, i.e. the starting powder mixture was deagglomerated and homogenised by the grinding process.

What is claimed is:

1. A process for the preparation of sinterable Si$_3$N$_4$ powder consisting essentially of Si$_3$N$_4$ particles and sintering additives wherein the particles have an average particle size of less than 1 μm, with no particles having a diameter greater than 100 μm, have a total content of metallic impurities less than 1000 ppm and an iron content of less than 200 ppm, and wherein the sintering additives are uniformly distributed throughout the powder which consists essentially of co-grinding together in a spiral jet mill pulverulent sintering additive and Si$_3$N$_4$ with less than 1000 ppm metallic impurities.

2. A process according to claim 1 which comprises grinding in the presence of air, nitrogen or argon.

3. A process according to claim 2 wherein the gas pressure is from 2 to 10 bar.

4. A process according to claim 1, wherein the parts of the spiral jet mill contacting material being ground are fabricated from a non-metallic material.

5. A process according to claim 4 wherein the non-metallic material is a ceramic material chosen from the group consisting of B$_4$C, Al$_2$O$_3$, SiC, and Si$_3$N$_4$.

* * * * *